Sept. 21, 1965 W. KIRYLUK ETAL 3,207,987

RADIO RESCUE APPARATUS

Filed Jan. 31, 1961 4 Sheets-Sheet 1

INVENTORS
Wlodzimierz Kiryluk, Ronald Parsons, & Roy Reginald Pierce.
BY [signature]
ATTORNEY INVENTORS
Wlodzimierz Kiryluk, Ronald
Parsons, & Roy Reginald Pierce.
BY
ATTORNEY INVENTORS
Wlodzimierz Kiryluk, Ronald
Parsons, & Roy Reginald Pierce.
BY [signature]
ATTORNEY INVENTORS
Wlodzimierz Kiryluk, Ronald
Parsons, & Roy Reginald Pierce.
BY [signature]
ATTORNEY.

United States Patent Office 3,207,987
Patented Sept. 21, 1965

3,207,987

RADIO RESCUE APPARATUS

Wlodzimierz Kiryluk, 32 Pickhurst Park, Bromley, England; Ronald Parsons, 65 Heversham Road, Bexleyheath, England; and Reginald Roy Pierce, 8 Goodwin Drive, Sidcup, England Filed Jan. 31, 1961, Ser. No. 86,235
1 Claim. (Cl. 325—104)

This invention relates to radio apparatus designed to be carried by pilots and others travelling in aeroplanes, and to be brought into use in the event of the wearer being forced to bale out, possibly into the sea.

The first purpose of the apparatus is to serve as a radio beacon emitting signals by which a rescuing aircraft may locate the user. A further purpose is to make possible communication by speech between the user and a rescuing aircraft.

Such apparatus of necessity takes its power from a battery, and the problem arises of reconciling the production of powerful signals with long life of the battery; for weak singals will not be effective unless the rescuing aircraft comes within a short range of the beacon, and powerful signals are not of great value if they cease after a short time.

The present invention utilises thermionic valves to generate a carrier and transistor circuits to modulate the carrier.

For further economy the beacon signals are broken into pulses, and transistor circuits are used to effect the pulsing.

A preferred receiver for speech is a self-quenching super-regenerative detector, the output of which is amplified by a transistor amplifier for application to a speech unit which can serve as a telephone receiver or as a microphone.

For economy in the construction of the apparatus its components may be made to serve more than one purpose. The transistor used as an oscillator in the beacon can serve as an amplifier in the reception and transmission of speech.

These and other features of the invention are described in further detail with reference to examples of the invention illustrated by the accompanying drawings.

In both forms of apparatus thermionic valves are used for the generation and amplification of radio frequency oscillations, that is of a beacon and speech carrier, and transistors for audio frequency modulation and amplification, and for dividing the audio-modulated beacon signals into pulses. The apparatus is naturally battery-operated, the battery including a high tension part, HT+ HT—, say of 150 volts, and a low tension part LT+ LT— for filament heating, and in the case of FIG. 1, a low voltage part TB+ TB— of, say, 6 volts for transistor operation. For the sake of clearness some connections to battery are omitted; it will be obvious that points marked with battery terminal references are joined to those battery terminals.

Figure 1A:
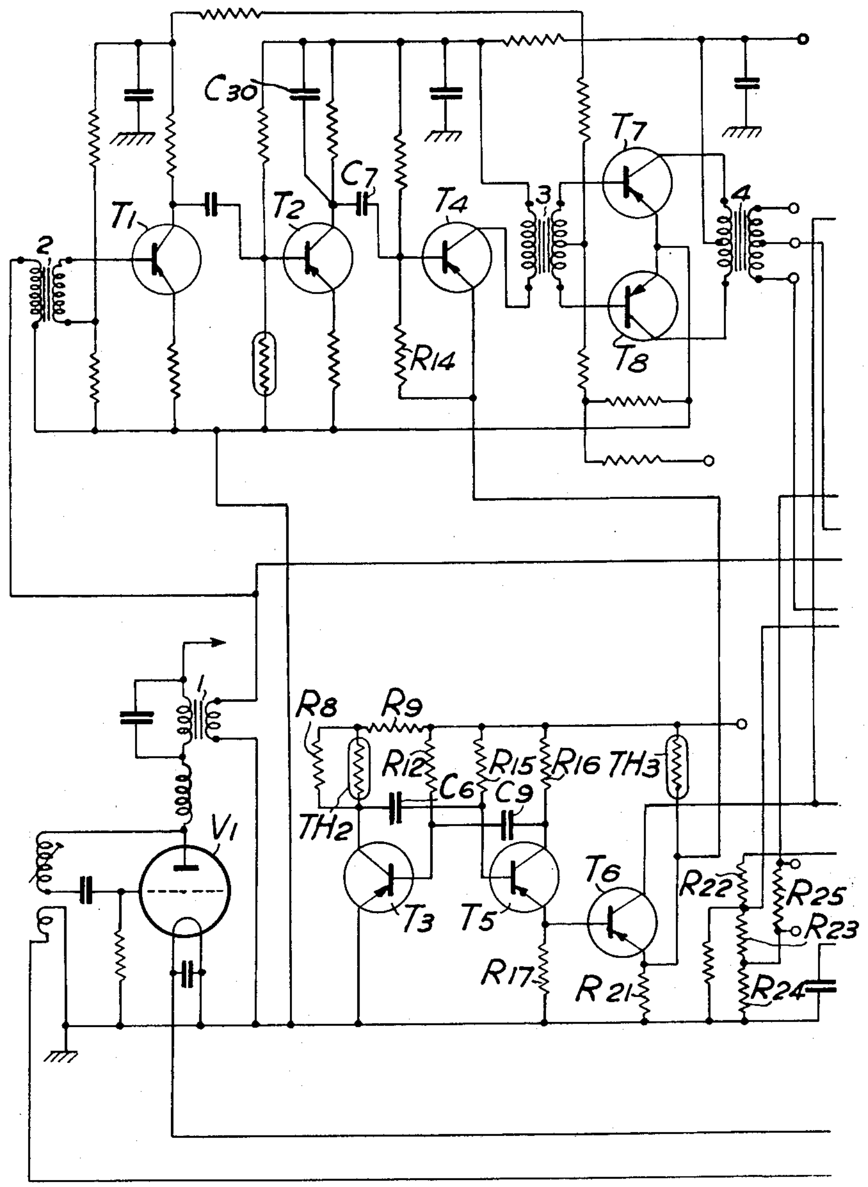
FIGURES 1A and 1B show the connections of a rescue apparatus which provides for transmission and reception of speech, and for continuous emission of beacon signals when speech communication is not in use.
Figure 1B:
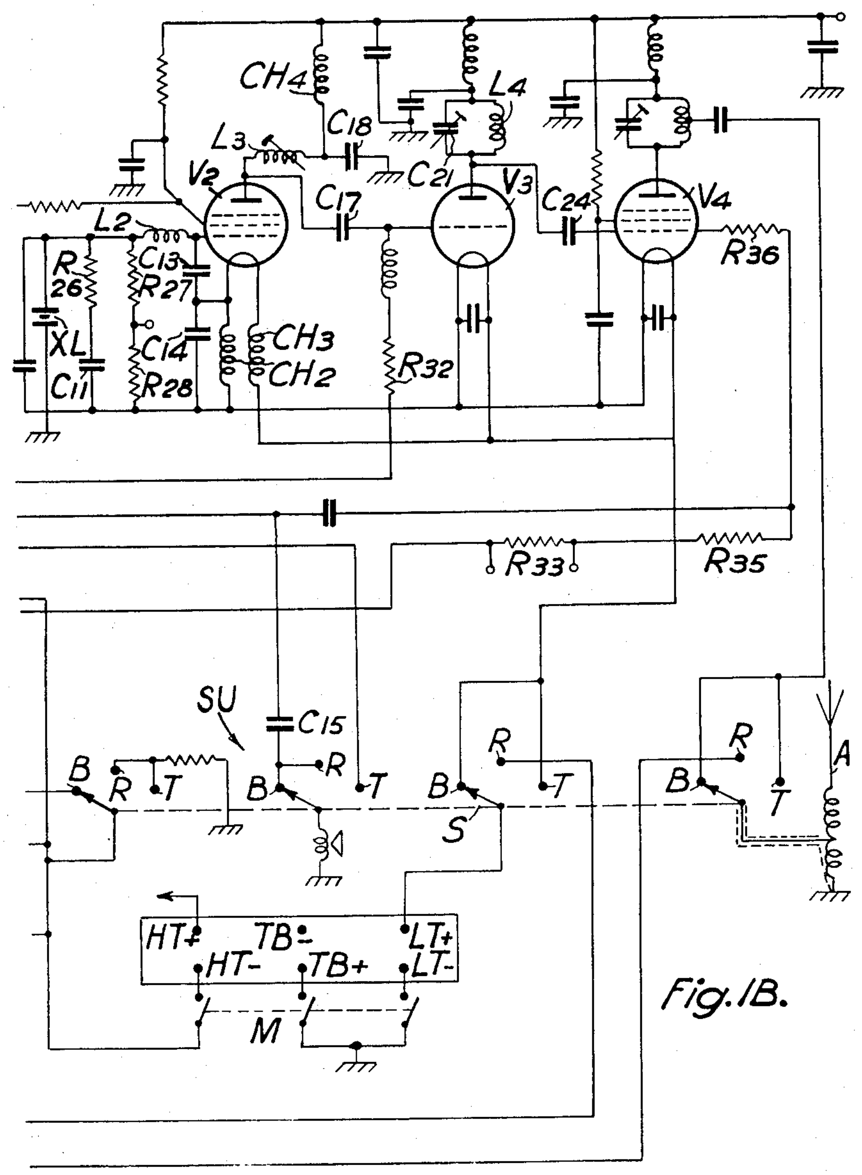

In FIG. 1 the carrier frequency is generated by an oscillator V2 controlled by a crystal XL, of which the fundamental and second harmonic are damped by resistor R26, so that the grid of V2 receives the third harmonic through inductance L2, and to this harmonic the input circuit L2, XL, C13, C14 is tuned; the output circuit L3, C17 (taken with the input capacitance of V3) is tuned to the second harmonic of the oscillator frequency so that this circuit acts as a frequency doubler. C11, R27 and R28 provide self bias for V2; CH4 and C18 de-couple the output circuit; C13 and C14 provide feed-back to maintain oscillation, and radio-frequency chokes CH2, CH3 separate the oscillatory circuits from the low tension circuits. Valve V3 and its associated components serves as an amplifiter and frequency doubler, its anode circuit C21, L4, being tuned to twice the frequency of the output from the oscillator doubler circuit and valve V4 with its associated components acts as a power amplifier at the output frequency, being self-biased by C24 and R36.

The apparatus is intended to be worn by an aviator, who, if he has occasion to bale out, releases a self-erecting antenna A which automatically closes main switch M thereby connecting the battery terminals to the circuit and setting the beacon in action. Another switch, selector switch S, can be brought by the aviator to position T if he wishes to speak to a rescuing aircraft which has located him, or to position R if the aircraft desires to speak to him, and the switch when released returns to position B causing the beacon to operate.

As above indicated, to obtain powerful beacon signals with minimum consumption of the battery so that the beacon may operate over a long time, the signal are emitted in pulses. To lessen the risk of the apparatus being passed over by an aircraft searching for it the signals should not wholly cease between pulses. The desired wave form therefore is a continuous wave of small amplitude, which during pulses is much increased in amplitude and also is audio-modulated.

The requisite change in amplitude is brought about by varying the grid bias of the amplifier V3 and V4. The repetition frequency and the length of pulse and pulse interval are determined by transistors T3, T5, which with their associated components C6, C9, R8, R9, R12, R15, R16, R17, and thermistor TH2, act as a multi-vibrator. Capacitor 9 is of less capacitance than C6 and R16 of less resistance than R8 and TH2 in parallel. So one switch S closing upon contacts B, C9 is first to become charged through T3 and T3 is then cut off until C9 has sufficiently discharged through R12 and R16. When T3 again conducts T5 is cut off. C6 then re-charges through T3 while C9 discharges through R12, T5 and R17 until T5 again conducts. This multivibrator cycle is in itself well known, and it is well known that the length of time each transistor conducts may be adjusted as desired by suitable choice of the associated components. For example T3 may be made to conduct for two and a half seconds, and T5 for half a second.

Now valve V3 gets its bias from and through the resistors R22, to R25 and R32 and V4 gets bias from R23, R24 through R33, R35 and R36; for R22, R23 and R24 carry the whole current of valves V2, V3, V4. With this bias the beacon output is small.

But when T5 conducts it makes the base of T6 negative and T6 also conducts, substantially short-circuiting resistors R22, R23, R24 and itself carrying the valve current. The bias on valves V3, V4, then permits great amplification. For example the output power may rise to half a watt from say 10 milliwatts.

The thermistor TH3 and resistor R21 provide a small bias with temperature compensation for transistor T6.

During the high-power pulses the carrier is audio-modulated. The modulation is derived from transistor oscillator T4 through transformer 3, push-pull amplifiers T7 and T8 and transformer 4; the secondary circuit of transformer 4 includes capacitor C15, the speaking and receiving unit SU and resistor 21, and these complete a positive feed-back loop via 21 through which any oscillator output is returned to the emitter of T4, and thus appears across R14 between emitter and base, the base being returned to TB— through C7 and C30. It will be noted that this audio modulation can be heard in the speaking and receiving unit SU so that the aviator, if conscious, knows his beacon is operating.

When switch S is brought to the contacts T the speech unit SU is connected to transformer 2, and the speech signals are amplified by the transistors T1, T2, T4, T7 and T8 and appear on the grid of output valve V4 thereby modulating the carrier.

When switch S is brought to the contacts R the antenna A is coupled to the grid of the self-quenching, supergenerative detector V1, and the anode circuit of V1 is coupled through step-down transformer 1 and step-up transformer 2 to the amplifier T1, is amplified in T1, T2, T4, T7 and T8 and reaches the speech unit SU through C15.

Figure 2:
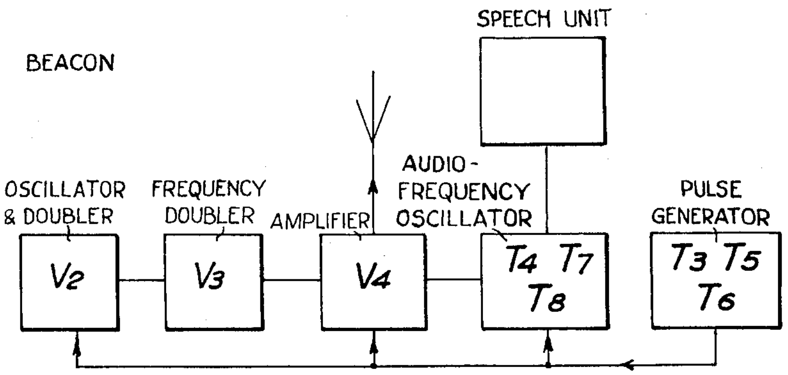
FIGURES 2, 3 and 4 are corresponding block diagrams showing the parts in use in the beacon, in reception and in transmission respectively.
Figure 3:
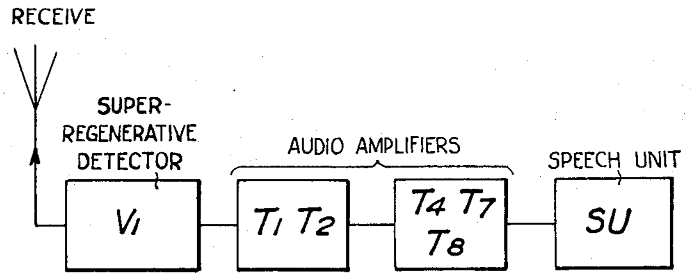
Figure 4:
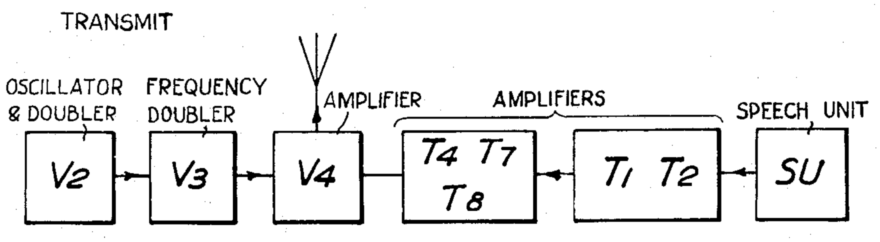

The effect of the several settings of switch S appear most simply from FIGS. 2, 3 and 4; FIG. 2 showing the connections of the beacon, FIG. 3 the connections for receiving, and FIG. 4 the connections for speaking.

Figure 5:
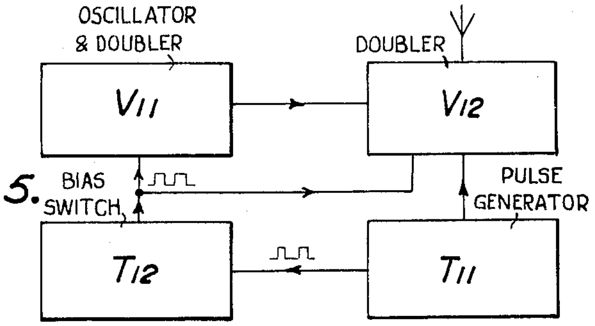
FIGURE 5 is a block diagram.
Figure 6:
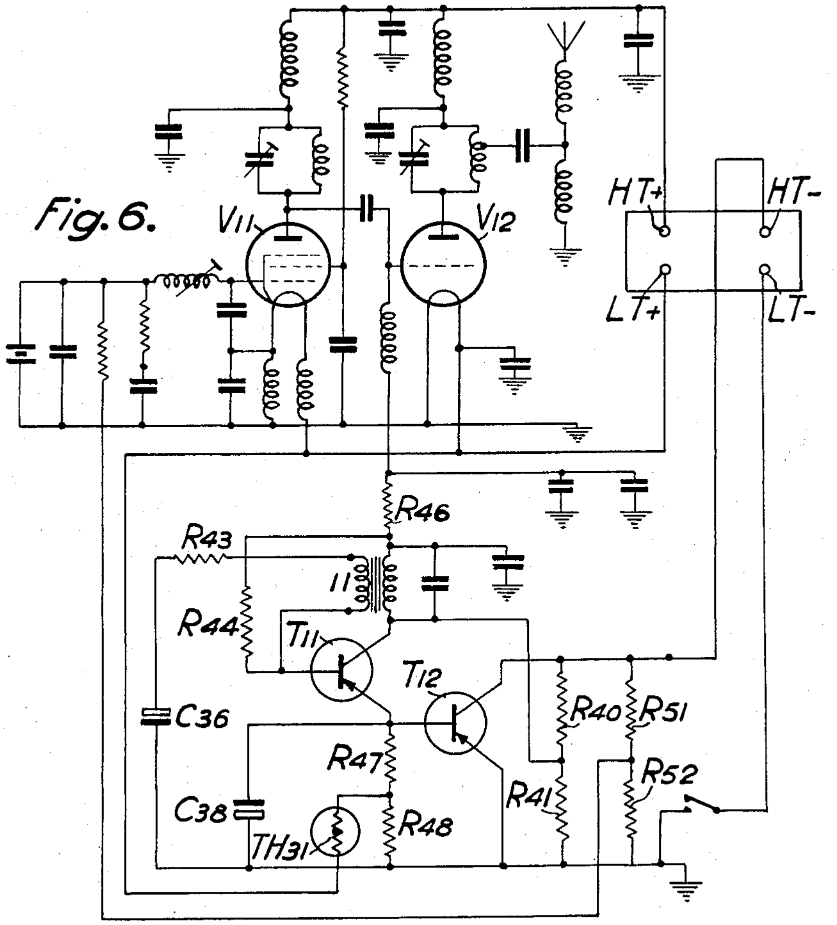
FIGURE 6 is a diagram of connections of a rescue apparatus providing beacon signals only.

A simpler form of rescue apparatus, not affording facilities for communication by speech, is shown in FIGS. 5 and 6. As in FIG. 1 the signal carrier is generated and amplified by thermionic valves, and the carrier is audio-modulated and its amplitude periodically changed by transistors. V11 is a crystal-controlled oscillator and frequency doubler generally similar to V2, and V12 is a frequency doubler and power amplifier. Audio-frequency modulation is supplied to V12 by the oscillator T11. The bias for V12 is obtained via the secondary winding of transformer 11 and resistor R46 the potentiometer R40, R41 which is in series with HT—. But R40, R41 are bridged by the emitter-collector circuit of T12. The smaller resistances R51, R52 carry the cathode current of the valves and supply bias to the oscillator and doubler V11.

With these bias voltages V11 and V12 produce a continuous wave output of a few milliwatts. The grid current of V12 during negative peaks of the input from V11 supplies energy to transistor T11, which conducts when its base becomes negative with respect to its emitter, and oscillation results. An audio frequency modulation is then imposed on the grid of V12. The alternating component of the emitter-collector current of T11 is bypassed to chassis by capacitor C38 and does not affect T12; but the D.C. component makes the base of T12 negative with respect to its emitter and T12 will conduct, substantially short-circuiting R40, R41 and R51, R52. These resistances in the output circuit of V12 being thus short-circuited its output now audio modulated increases greatly.

But whenever the base of T11 is negative current is drawn from capacitor C36, which step by step becomes positively charged until it reaches the peak value of the feed-back voltage from T11, when oscillation ceases, and capacitor 38 discharges through resistors R37, R38. Capacitor C36 discharges through R43 and T11 until T11 again conducts and the cycle is repeated.

A thermistor TH31 provides a small positive bias for T12 between pulses; and compensates for increase in collector current with temperature, thus permitting satisfactory operation of T12 at high temperature.

We claim:

A rescue apparatus comprising a radio beacon including an antenna, thermionic tube means for generating, amplifying, and supplying to said antenna a radio frequency carrier, said generating and amplifying means including the combination of an oscillator, a thermionic tube amplifier fed thereby, a current-carrying resistor in the grid circuit of said amplifier supplying bias to the grid, a transistor in the grid of said tube amplifier connected in parallel with said resistor modifying the output of said amplifier in dependence to said transistor being alternately conductive and substantially non-conductive, a transistor multivibrator circuit connected to said transistor to render it alternately conductive and non-conductive in a cycle having a repetition rate on the order of seconds in duration, said transistor being conductive for a substantially shorter period in comparison to its being non-conductive in each cycle, and a thermistor and resistor in the grid circuit of said tube amplifier; and an audio frequency transistor connected to said generating amplifying means; wherein said resistors, said first-mentioned transistor, and said thermistor are in the grid circuit of said amplifier, said audio frequency transistor being connected to apply audio modulation to said amplifier through said first-mentioned transistor when that transistor is conducting, and the value of said resistor in parallel with said first-mentioned transistor in the grid circuit of said amplifier being such that when said first-mentioned transistor does not conduct said amplifier supplies a continuous wave output of small amplitude to said antenna.

References Cited by the Examiner

UNITED STATES PATENTS

| | | | |
|---|---|---|---|
| 2,935,606 | 5/60 | Harrison et al. | 250—13 |
| 2,943,188 | 6/60 | Knott et al. | 250—13 |
| 3,068,415 | 12/62 | Johnson | 325—104 |

FOREIGN PATENTS

| | | |
|---|---|---|
| 798,997 | 7/58 | Great Britain. |

DAVID G. REDINBAUGH, *Primary Examiner.*

GEORGE WESTBY, *Examiner.*